United States Patent
Fang et al.

(10) Patent No.: US 11,093,245 B2
(45) Date of Patent: Aug. 17, 2021

(54) COMPUTER SYSTEM AND MEMORY ACCESS TECHNOLOGY

(71) Applicant: Huawei Technologies Co., Ltd., Shenzhen (CN)

(72) Inventors: Lei Fang, Hangzhou (CN); Xi Chen, Shanghai (CN); Weiguang Cai, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 22 days.

(21) Appl. No.: 16/439,335

(22) Filed: Jun. 12, 2019

(65) Prior Publication Data
US 2019/0294442 A1 Sep. 26, 2019

Related U.S. Application Data

(63) Continuation of application No. PCT/CN2016/109518, filed on Dec. 12, 2016.

(51) Int. Cl.
G06F 9/30 (2018.01)
G06F 13/16 (2006.01)
G06F 12/08 (2016.01)

(52) U.S. Cl.
CPC ...... *G06F 9/30043* (2013.01); *G06F 9/30087* (2013.01); *G06F 9/30105* (2013.01); *G06F 12/08* (2013.01); *G06F 13/1668* (2013.01)

(58) Field of Classification Search
None
See application file for complete search history.

(56) References Cited

U.S. PATENT DOCUMENTS

| | | | |
|---|---|---|---|
| 2003/0126408 A1* | 7/2003 | Vajapeyam | G06F 9/384 712/214 |
| 2004/0128487 A1* | 7/2004 | Brashears | G06F 9/3855 712/225 |

(Continued)

FOREIGN PATENT DOCUMENTS

| | | |
|---|---|---|
| CN | 101211257 A | 7/2008 |
| CN | 102841857 A | 12/2012 |

(Continued)

OTHER PUBLICATIONS

Yang et al., "Overlapping dependent loads with addressless preload," 2006 International Conference on Parallel Architectures and Compilation Techniques, Seattle, Washington, XP058335395, pp. 275-284, Institute of Electrical and Electronics Engineers, New York, New York (Sep. 16-20, 2006).

(Continued)

*Primary Examiner* — John M Lindlof
(74) *Attorney, Agent, or Firm* — Leydig, Voit & Mayer, Ltd.

(57) ABSTRACT

A computer system and a memory access technology are provided. In the computer system, when load/store instructions having a dependency relationship is processed, dependency information between a producer load/store instruction and a consumer load/store instruction can be obtained from a processor. A consumer load/store request is sent to a memory controller in the computer system based on the obtained dependency information, so that the memory controller can terminate a dependency relationship between load/store requests in the memory controller locally based on the dependency information in the received consumer load/store request, and execute the consumer load/store request.

13 Claims, 4 Drawing Sheets

(56) References Cited

U.S. PATENT DOCUMENTS

| | | | |
|---|---|---|---|
| 2006/0064546 A1 | 3/2006 | Arita et al. | |
| 2007/0234014 A1 | 10/2007 | Kobayashi et al. | |
| 2009/0106499 A1 | 4/2009 | Aoki et al. | |
| 2010/0095151 A1 | 4/2010 | Kobayashi et al. | |
| 2014/0143519 A1 | 5/2014 | Heidelberger et al. | |
| 2019/0250916 A1* | 8/2019 | Lu .................. | G06F 9/30185 |

FOREIGN PATENT DOCUMENTS

| | | |
|---|---|---|
| CN | 104216837 A | 12/2014 |
| CN | 105095149 A | 11/2015 |
| CN | 105934933 B | 6/2020 |

OTHER PUBLICATIONS

Hashemi et al., "Accelerating Dependent Cache Misses with an Enhanced Memory Controller," 2016 43rd Annual International Symposium on Computer Architecture, Seoul, Republic of Korea, XP032950679, pp. 444-455, Institute of Electrical and Electronics Engineers, New York, New York (Jun. 18-22, 2016).

* cited by examiner

COMPUTER SYSTEM AND MEMORY ACCESS TECHNOLOGY

CROSS-REFERENCE TO RELATED APPLICATIONS

This application is a continuation of International Application No. PCT/CN2016/109518, filed on Dec. 12, 2016, the disclosure of which is hereby incorporated by reference in its entirety.

TECHNICAL FIELD

Embodiments of the present disclosure relate to the field of storage technologies, and in particular, to a computer system and a memory access technology.

BACKGROUND

As integrated circuit techniques are ever growing, imbalance between a processor speed and a memory speed becomes distinct increasingly, and memory access becomes a bottleneck in computing systems. In an actual application, a delay of accessing a memory is referred to as a load/store delay. Generally, the load/store delay may be classified into two parts: an on-chip delay and a memory access delay. The on-chip delay is a communication delay between a processor core and a memory controller. The memory access delay is a delay of the memory controller in accessing an off-chip memory. As a processor chip scale continuously increases, more processor cores are integrated on the processor chip. This increases the on-chip delay and intensifies impact caused by the load/store delay.

In a process of implementing the present disclosure, it is found that a plurality of load/store instructions having a dependency relationship need to be completed one after another. Therefore, in the prior art, a plurality of load/store instructions having a dependency relationship usually can be processed only after on-chip communication is performed for many times. For example, a pair of load/store requests having a dependency relationship is processed. A processor core needs to first send a producer load/store request to a memory controller. Then, the processor core receives request content that is obtained from the producer load/store request and that is returned by the memory controller to the processor core. Subsequently, the processor core obtains, based on the request content obtained from the producer load/store request, a consumer load/store address, and sends a consumer load/store request to the memory controller based on the obtained consumer load/store address. Finally, the memory controller returns, to the processor core based on the consumer load/store request, request content obtained from the consumer load/store request. It should be noted that in this application, the producer load/store request is a memory access request whose access result is depended on by other memory access requests, and the consumer load/store request is a memory access request whose access needs to depend on an access result of another access request. As can be learned from the process of processing the load/store requests having a dependency relationship in the prior art, a relatively large memory access delay is caused because in the prior art, the plurality of load/store requests having a dependency relationship can be processed only after on-chip communication is performed for many times.

SUMMARY

Embodiments of this application provide a computer system and a memory access technology, to reduce a memory access delay and improve memory access efficiency.

According to a first aspect, an embodiment of this application provides a computer system. The computer system includes a processor and a memory controller. In the computer system, the processor is configured to obtain first dependency information between a first to-be-processed load/store instruction and a second to-be-processed load/store instruction. The first dependency information is used to indicate that an address to be accessed by using the second load/store instruction depends on a value of a first destination register of the first load/store instruction, and the first destination register is configured to store a first load/store result of the first load/store instruction. In addition, the processor sends a first load/store request to a memory controller in the computer system based on the first load/store instruction; and sends a second load/store request to the memory controller based on the second load/store instruction, where the second load/store request includes the first dependency information. The memory controller may access a memory of the computer system based on the first load/store request, to obtain the first load/store result. In addition, the memory controller may calculate, based on the first load/store result and the first dependency information, an address to be accessed by using the second load/store request; and execute the second load/store request based on the address to be accessed by using the second load/store request, to obtain a second load/store result. The memory controller returns the first load/store result and the second load/store result to the processor.

In the computer system provided in this application, the processor may obtain the first dependency information between the first load/store instruction and the second load/store instruction in an instruction queue, send the first load/store request to the memory controller based on the first load/store instruction, and send the second load/store request to the memory controller based on the second load/store instruction and the first dependency information. Moreover, when processing load/store instructions having a dependency relationship, the processor still send a load/store request to the memory controller even if the load/store instruction does not hit a cache. Thus, A subsequent instruction of the load/store instruction cannot be blocked in the processor. Resources of the processor occupied by processing instructions is reduced. A waiting delay of the subsequent instruction is also reduced.

Further, when the memory controller receives the first load/store request and the second load/store request having a dependency relationship, the memory controller may first execute the first load/store request. After obtaining the first load/store result of the first load/store request, the memory controller may calculate, based on the first load/store result and the first dependency information carried in the second load/store request and based on a predefined calculation method, the address to be accessed by using the second load/store request, to terminate the dependency relationship between the second load/store request and the first load/store request in the memory controller; and execute the second load/store request based on the calculated address to be accessed by using the second load/store request, to obtain the second load/store result. In the computer system provided in this application, the memory controller can terminate the dependency relationship between load/store requests locally in the memory controller without re-communication with the processor, and execute a consumer load/store request. A quantity of times of communication between the memory controller and a processor core is reduced, a memory access delay is reduced, and network resources are saved.

In addition, description of dependency information is added to the load/store request received by the memory controller, so that when processing load/store requests having a dependency relationship, the memory controller can obtain the address to be accessed by using the second load/store request through simple calculation. In an actual application, the memory controller can calculate, with only one adder, an address to be accessed by using the consumer load/store request. Therefore, hardware overheads of the memory controller are relatively low.

In a possible implementation, the first dependency information includes an identifier of the first destination register and first offset information, and the first offset information is used to indicate an offset of the address to be accessed by using the second load/store request. The memory controller calculates, based on the first load/store result and the first offset information and based on a predefined calculation method, the address to be accessed by using the second load/store request.

In a possible implementation, the predefined calculation method includes:

$$\text{Address} = \sum_{k=1}^{n} REG[SR_k] + \text{Offset},$$

where Address is a memory address to be accessed by a load/store request, n is a quantity of registers on which the load/store request depends, $REG[SR_k]$ is used to indicate content stored in a $k^{th}$ register on which the load/store request depends, and Offset is an address offset.

In a possible implementation, the processor may obtain dependency information between instructions based on an identifier of a source register and an identifier of a destination register of each instruction in the instruction queue.

In a possible implementation, the processor is configured to set a first identifier for the first destination register when the first load/store instruction does not hit a cache of the computer system, where the first identifier is used to indicate that a value of the first destination register is speculative. Then, the processor sends the first load/store request to the memory controller based on the first load/store instruction. In such a manner, subsequent instructions of the first load/store instruction blocked in the processor can be reduced, and a waiting delay of a subsequent instruction can be reduced.

In a possible implementation, the processor is further configured to: obtain third dependency information between a third to-be-processed load/store instruction and the first load/store instruction, and send, to the memory controller based on the third load/store instruction, a third load/store request carrying the third dependency information. An address to be accessed by using the third load/store instruction depends on a destination register of a fourth instruction, and a source register to be operated by the fourth instruction depends on the first destination register. The source register to be operated by the fourth instruction is used to store data to be operated by the fourth instruction, and the fourth instruction is used to instruct to calculate the value of the first destination register. The third dependency information includes the identifier of the first destination register and second offset information that is obtained based on the fourth instruction. The memory controller is further configured to calculate, based on the first load/store result and the second offset information, an address to be accessed by using the third load/store request; and execute the third load/store request based on the address to be accessed by using the third load/store request, to obtain a third load/store result.

In a possible implementation, the processor is further configured to determine that the source register to be operated by the to-be-processed fourth instruction is a destination register of the first load/store instruction. The fourth instruction is used to instruct to calculate the value of the first destination register, and the source register to be operated by the fourth instruction is used to store data to be operated by the fourth instruction. The processor is further configured to set a second identifier for a fourth destination register of the fourth instruction and record second dependency information of the fourth instruction. The fourth destination register is configured to store an execution result of the fourth instruction, the second identifier is used to indicate that a value of the fourth destination register depends on values of other registers, the second dependency information includes the identifier of the first destination register, and the second dependency information is used to indicate that the value of the fourth destination register depends on the value of the first destination register.

In a possible implementation, the processor is further configured to update a value of the destination register of the first load/store instruction based on the first load/store result. Specifically, the memory controller may store the first load/store result in a cache of the processor. The processor executes the first load/store instruction, obtains the first load/store result from the cache, and stores the first load/store result in the destination register of the first load/store instruction.

According to a second aspect, this application provides a processor, including an instruction queue and a load/store unit. The instruction queue is configured to: cache a first to-be-processed load/store instruction and a second to-be-processed load/store instruction and obtain first dependency information between the first load/store instruction and the second load/store instruction. The load/store unit is configured to send a first load/store request to a memory controller in a computer system based on the first load/store instruction. The load/store unit is further configured to send a second load/store request to the memory controller based on the second load/store instruction, where the second load/store request includes the first dependency information. The first dependency information is used to indicate that an address to be accessed by using the second load/store instruction depends on a value of a first destination register of the first load/store instruction, and the first destination register is configured to store a first load/store result of the first load/store instruction.

In a possible implementation, the load/store unit sets a first identifier for the first destination register when the first load/store instruction does not hit a cache of the computer system, and sends the first load/store request to the memory controller based on the first load/store instruction. The first identifier is used to indicate that a value of the first destination register is speculative. In such a manner, subsequent instructions of the first load/store instruction blocked in the processor can be reduced, and a waiting delay of a subsequent instruction can be reduced.

In a possible implementation, the instruction queue is further configured to obtain third dependency information between a third to-be-processed load/store instruction and the first load/store instruction. An address to be accessed by using the third load/store instruction depends on a destination register of a fourth instruction, a source register to be operated by the fourth instruction depends on the first destination register, the source register to be operated by the fourth instruction is used to store data to be operated by the fourth instruction, and the fourth instruction is used to instruct to calculate the value of the first destination register. The load/store unit is further configured to send, to the memory controller based on the third load/store instruction, a third load/store request carrying the third dependency information. The third dependency information includes the identifier of the first destination register and second offset information that is obtained based on the fourth instruction.

According to a third aspect, an embodiment of this application provides a memory controller, including virtual modules respectively configured to implement functions implemented by the memory controller according to any one of the first aspect and the possible implementations of the first aspect.

According to a fourth aspect, this application provides a memory access method, where the method is performed by a processor and a memory controller in a computer system, to implement functions implemented by the processor and the memory controller according to the first aspect and the possible implementations of the first aspect.

According to a fifth aspect, this application provides an instruction processing method, where the method is performed by a processor in a computer system, to implement functions implemented by the processor according to the first aspect and the possible implementations of the first aspect.

According to a sixth aspect, this application provides another memory access method, where the method is performed by a memory controller in a computer system, to implement functions implemented by the memory controller according to the first aspect and the possible implementations of the first aspect.

According to a seventh aspect, this application provides a computer program product, including a computer-readable storage medium storing program code, where an instruction included in the program code is used to implement at least one method according to the fourth aspect, the fifth aspect, and the sixth aspect.

BRIEF DESCRIPTION OF DRAWINGS

To describe technical solutions in embodiments of the present disclosure more clearly, the following briefly describes the accompanying drawings required for describing the embodiments. Obviously, the accompany drawings described in the following are merely some embodiments of the present disclosure.

DESCRIPTION OF EMBODIMENTS

To make a person skilled in the art better understand the technical solutions in the present disclosure, the following describes the technical solutions in the embodiments of the present disclosure in detail with reference to the accompanying drawings in the embodiments of the present disclosure. Apparently, the described embodiments are merely some but not all of the embodiments of the present disclosure.

Figure 1:
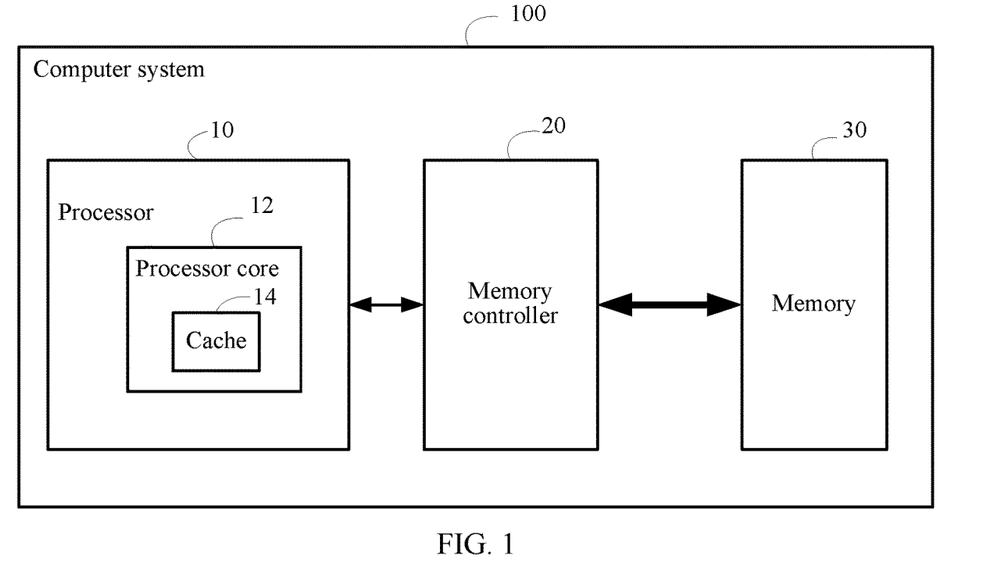
FIG. 1 is a schematic structural diagram of a computer system according to an embodiment of the present disclosure.

FIG. 1 is a schematic structural diagram of a computer system according to an embodiment of the present disclosure. As shown in FIG. 1, the computer system 100 may include at least a processor 10, a memory controller 20, and a memory 30. The processor 10 is an arithmetic core and a control core of the computer system 100. The processor 10 may be a very large scale integrated circuit. The processor 10 has an operating system and other software programs installed thereon, so that the processor 10 can access the memory, a cache, and a magnetic disk of the computer system 100. A person skilled in the art may understand that, the processor 10 may be a central processing unit (CPU), or may be a processing circuit including at least one processor core 12 or other one or more application-specific integrated circuits (ASIC) configured to implement this embodiment of the present disclosure. With development of integrated circuits technologies, more processor cores 12 may be integrated into the processor 10. When a plurality of processor cores 12 are integrated into the processor 10, the plurality of processor cores 12 may be interconnected to each other by using an on-chip network. It may be understood that, in an actual application, the computer system may further include a plurality of processors. For example, one processor is used as an example in this embodiment of the present disclosure. In this embodiment of the present disclosure, a quantity of processors and a quantity of processor cores in one processor are not limited.

A cache 14 is a temporary memory located between the processor 10 and the memory 30 in the computer system 100. Usually, the cache 14 includes a static random access memory (SRAM). Using the computer system shown in FIG. 1 as an example, because the cache 14 has a relatively high rate, the cache 14 is configured to exchange data with the processor core 12 at a high rate. Data in the cache 14 is a part of data in the memory 30. When the processor core 12 accesses data, the processor core 12 first searches the cache 14 for data. Only when data required by the processor core 12 is not in the cache 14, the processor core 12 accesses the memory 30, thereby accelerating an access rate of the processor core 12. Specifically, the cache 14 may include a control device and a storage medium. The control device in the cache 14 may return data cached in the storage medium of the cache 14 to the processor core 12 based on an operation instruction of the processor core 12. The control device in the cache 14 may further cache to-be-written data to the storage medium of the cache 14 based on a write operation instruction of the processor core 12. A person skilled in the art may understand that the cache 14 may be integrated into the processor 10. In a multi-core processor system, each processor core 12 may include one cache 14.

The memory controller 20 is a bus circuit controller that controls the memory 30 inside the computer system 100 and that is configured to manage and plan data transmission between the memory 30 and the processor 10. The memory controller 20 is an important component for data exchange between the memory 30 and the processor 10 (for example, a CPU). Data may be exchanged between the memory 30 and the processor 10 by using the memory controller 20. The memory controller 20 may be a separate chip and connected to the processor 10 by using a system bus. A person skilled in the art may understand that the memory controller 20 may alternatively be integrated into the processor 10 or built in a northbridge. A specific location of the memory controller 20 is not limited in this embodiment of the present disclosure. For ease of description, in the system architecture shown in FIG. 1, a description is provided by using an example in which the memory controller 20 is separately disposed. The memory controller 20 controls necessary logic to write data into the memory 30 or read data from the memory 30.

The memory 30 is a main memory of the computer system 100. The memory 30 is usually configured to store various pieces of software currently running in an operating system, input and output data, and information exchanged with an external device. To improve an access rate of the processor 10, the memory 30 needs to have an advantage of a high access rate. In a conventional computer system architecture, a dynamic random access memory (DRAM) usually is used as the memory 30. With development of non-volatile memory (NVM) technologies, novel NVMs such as a phase-change random access memory (PCM), a resistive random access memory (RRAM), a magnetic random access memory (MRAM), or a ferroelectric random access memory (FRAM) are also gradually used as a memory. A specific storage medium of the memory 30 is not limited in this embodiment of the present disclosure.

Figure 2:
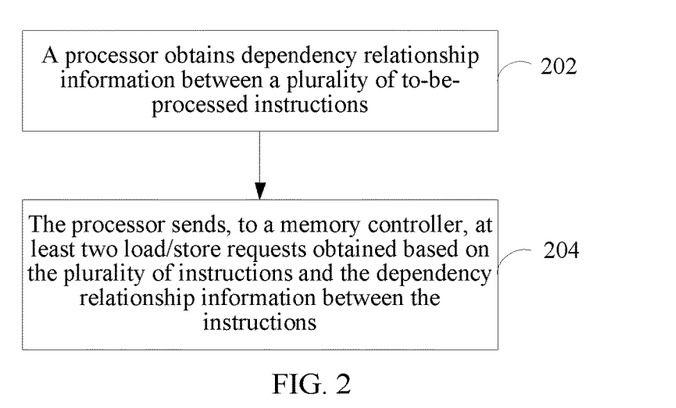
FIG. 2 is a flowchart of a method for processing a computer instruction according to an embodiment of the present disclosure.
Figure 3:
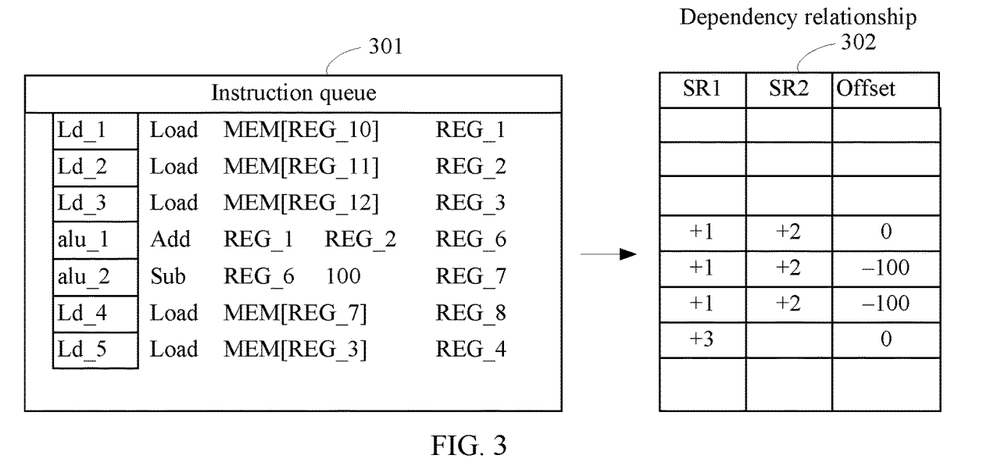
FIG. 3 is a schematic diagram of dependency information between instructions according to an embodiment of the present disclosure.
Figure 4:
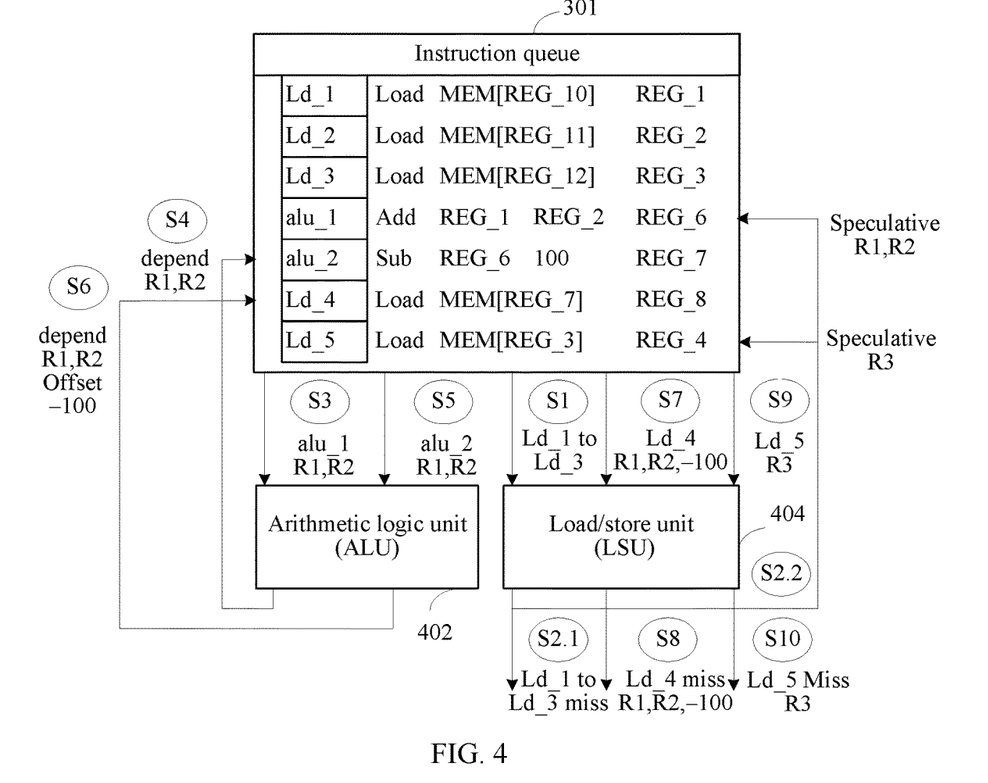
FIG. 4 is a signaling diagram of another method for processing a computer instruction according to an embodiment of the present disclosure.

A memory access technology provided in this embodiment of the present disclosure is described in detail below with reference to the computer system 100 shown in FIG. 1. FIG. 2 is a flowchart of a method for processing a computer instruction according to an embodiment of the present disclosure. FIG. 3 is a schematic diagram of dependency information between instructions according to an embodiment of the present disclosure. FIG. 4 is a signaling diagram of a method for processing a computer instruction according to an embodiment of the present disclosure. The method in FIG. 2 is described in detail below with reference to FIG. 3 and FIG. 4.

In step 202, a processor 10 obtains dependency information between a plurality of to-be-processed load/store instructions. A person skilled in the art may understand that, there are a plurality of to-be-processed computer instructions in an instruction queue of the processor 10, and the instructions may include a load/store instruction, an arithmetical instruction, and other instructions. In this application, processing on only a load/store instruction and an arithmetical instruction is described. The load/store instruction is an instruction that instructs the processor 10 to access the memory 30. The load/store instruction may include a load instruction and a store instruction. The load instruction is used to store data read from the memory 30 in a register. The store instruction is used to store the data in the register to the memory 30. A command format of the load/store instruction may be as follows:

Load <address> <Rd>: used to instruct to read data at a specified address in the memory and write the data to a register Rd; and Store <address> <Rd>: used to instruct to store the data in the register Rd at a specified address in the memory.

The arithmetical instruction is used to instruct the processor 10 to correspondingly calculate a value of the register. The arithmetical instruction may include an addition (add) instruction, a subtraction (sub) instruction, and the like. A format of the arithmetical instruction may be usually as follows:

Add <REG 1> <REG 2> <Rd>: used to perform an addition operation on data stored in a register REG 1 and data stored in a REG 2, and store an arithmetical result in a register Rd; and Sub <REG 1> <REG 2> <Rd>: used to perform a subtraction operation on data stored in a register REG 1 and data stored in a REG 2, and store an arithmetical result in a register Rd.

A person skilled in the art may understand that, to ensure data accuracy, a processing instruction in an instruction queue 301 can be executed only when a source register to be operated by the processing instruction is ready. For example, if there is a data dependency relationship between a second instruction and a first instruction, a source register to be operated by the second instruction depends on a processing result of the first instruction. If the first instruction has not been processed, the source register of the second instruction cannot be ready, and the second instruction cannot be executed. In this embodiment of the present disclosure, on the side of the processor 10, when the processor 10 processes a plurality of load/store instructions in an instruction queue 301, the processor 10 may obtain dependency relationships between all the load/store instructions based on identifiers of source registers and identifiers of destination registers that are carried in the load/store instructions. As shown in FIG. 3, the instruction queue 301 may include a plurality of load/store instructions: ld_1, ld_2, ld_3, ld_4, and ld_5, and further include a plurality of arithmetical instructions: alu_1 and alu_2. In this embodiment of the present disclosure, the processor 10 may obtain dependency relationships between a plurality of processing instructions in the instruction queue 301 based on an operation type of each instruction, a source address, and a destination address.

It should be noted that in this embodiment of the present disclosure, the source register is a register configured to store to-be-operated data, and the destination register is a register configured to store an execution result of an instruction. For a load/store instruction, the source register is a register configured to store a to-be-accessed memory address. The destination register is a register configured to store a load/store result. In other words, the source register is configured to store an operand. The operand stored in the source register of the load/store instruction may be used to generate a load/store address. An operand stored in a source register of an arithmetical instruction is to-be-operated content. A destination register is configured to store an operation result. A destination register of the load/store instruction is used to store a load/store result. A destination register of the arithmetical instruction is used to store an arithmetical result.

In the instruction queue 301, the load/store instruction ld_1 is used to instruct to read data that is in the memory and whose address is an address stored in a register 10 (REG_10) and write the data to a register 1 (REG_1). The load/store instruction ld_2 is used to instruct to read data that is in the memory and whose address is an address stored in a register 11 (REG_11) and write the data to a register 2 (REG_2). The load/store instruction ld_3 is used to instruct to read data that is in the memory and whose address is an address stored in a register 12 (REG_12) and write the data to a register 3 (REG_3). The arithmetical instruction alu_1 is used to instruct to add data in the register 1 (REG_1) and data in the register 2 (REG_2), and store a calculation result into a register 6 (REG_6). The arithmetical instruction alu_2 is used to instruct to subtract 100 from data in the register 6, and store a calculation result in a register 7 (REG_7). The load/store instruction ld_4 is used to instruct to read data that is in the memory and whose address is an address stored in the register 7 (REG_7) and write the data to a register 8 (REG_8). The load/store instruction ld_5 is used to instruct to read data that is in the memory and whose address is an address stored in the register 3 (REG_3) and write the data to a register 4 (REG_4).

As may be learned from the plurality of instructions in the instruction queue 301, execution of the load/store instructions ld_1, ld_2, and ld_3 does not depend on execution results of other instructions. Execution results of the load/store instructions ld_1, ld_2, and ld_3 are used by other load/store instructions to generate a load/store address. In this embodiment of the present disclosure, the load/store instructions ld_1, ld_2, and ld_3 may be referred to as producer instructions. Specifically, execution of the arithmetical instruction alu_1 needs to depend on the execution results of the instruction ld_1 and the instruction ld_2. Execution of the arithmetical instruction alu_2 needs to depend on an execution result of the instruction alu_1. Generation of the load/store address of the load/store instruction ld_4 needs to depend on an execution result of alu_2. Therefore, generation of the load/store address of the load/store instruction ld_4 needs to depend on the execution results of the load/store instructions ld_1 and ld_2. In other words, the load/store instruction ld_4 have a dependency relationship with the load/store instructions ld_1 and ld_2. In this embodiment of the present disclosure, an instruction whose execution result is used by another load/store instruction to generate a load/store address is referred to as a producer load/store instruction. A load/store instruction whose execution needs to depend on an execution result of another instruction is referred to as a consumer load/store instruction. Because the processor does not execute an action of accessing a memory based on an arithmetical instruction, execution of the arithmetical instruction does not affect a memory access delay. The arithmetical instruction transfers only a dependency relationship between load/store instructions. How to process load/store instructions having a dependency relationship is mainly described in detail in this embodiment of the present disclosure.

In this embodiment of the present disclosure, the processor may obtain dependency information between instructions based on an identifier of a source register and an identifier of a destination register of each processing instruction in the instruction queue 301. For clear description, in this embodiment of the present disclosure, the dependency relationship between the processing instructions in the instruction queue 301 may be presented in a form of a dependency relationship table 302. As shown in FIG. 3, an entry may be set up for each processing instruction to record a dependency relationship between the instruction and another instruction. To obtain an address to be accessed by a load/store instruction, in this embodiment of the present disclosure, the dependency relationship table 302 may include three pieces of information: $SR_1$, $SR_2$, and offset. $SR_1$ and $SR_2$ are identifiers of registers on which the instruction depends, a symbol in front of numbers of the registers indicate a positive or negative value, and offset is an immediate and used to indicate an address offset. Based on information in the dependency relationship table 302, a memory address to be accessed by a consumer access instruction may be calculated based on a calculation method below:

$$\text{Address} = \sum_{k=1}^{n} REG[SR_k] + \text{Offset},$$

n is a quantity of depended registers, and $REG[SR_k]$ is used to indicate content stored in a $k^{th}$ register on which a load/store request depends, where a value of k ranges from 1 to n.

As described above, execution of the load/store instructions ld_1, ld_2, and ld_3 does not need to depend on execution results of other instructions. Therefore, entries corresponding to the load/store instructions ld_1, ld_2, and ld_3 are null in the dependency relationship table 302. The arithmetical instruction alu_1 is used to instruct to add the data in the register 1 (REG_1) and the register 2 (REG_2), and store a calculation result into the register 6 (REG_6). Therefore, in the dependency relationship table 302, in entries corresponding to the arithmetical instruction alu_1, $SR_1$ and $SR_2$ are respectively +1 and +2. The arithmetical instruction alu_2 is used to instruct to subtract 100 from the data in the register 6, and store the calculation result in the register 7 (REG_7). The data in the register 6 is obtained by performing an operation on the data in the register 1 (REG_1) and the register 2 (REG_2) by using the arithmetical instruction (alu_1). Therefore, the arithmetical instruction alu_1 transfers a dependency relationship. In other words, REG_7=REG_1+REG_2−100. In the dependency relationship table 302, in entries corresponding to the arithmetical instruction alu_2, $SR_1$ and $SR_2$ may be respectively +1 and +2. Offset is −100. For the load/store instruction ld_4, the load/store instruction ld_4 is used to instruct to read data that is in the memory and whose address is an address stored in the register 7 (REG_7) and write the data to the register 8 (REG_8). The data in REG_7 is obtained by performing an operation twice on the data in the register 1 (REG_1) and the register 2 (REG_2) by using the arithmetical instructions alu_1 and alu_2. Therefore, the arithmetical instructions alu_1 and alu_2 transfer the dependency relationship. In the dependency relationship table 302, in entries corresponding to the load/store instruction ld_4, $SR_1$ and $SR_2$ may be respectively +1 and +2, and offset is −100. In other words, an address to be accessed by using the load/store instruction ld_4 is obtained by performing an operation twice on execution results of the load/store instructions ld_1 and ld_2 by using the arithmetical instructions alu_1 and alu_2, and the load/store instruction ld_4 finally depends on the execution results of the load/store instructions ld_1 and ld_2. For the load/store instruction ld_5, the load/store instruction ld_5 is used to instruct to read data that is in the memory and whose address is an address stored in the register 3 (REG_3) and write the data to the register 4 (REG_4). Therefore, the load/store instruction ld_5 depends on execution of the load/store instruction ld_3. In the dependency relationship table 302, in entries corresponding to the load/store instruction ld_5, $SR_1$ may be +3 and $SR_2$ is null, and offset is 0.

In step 204, the processor sends, to a memory controller 20, at least two load/store requests that are obtained based on the plurality of instructions and the dependency information between the instructions. A consumer load/store request in the at least two load/store requests carries the dependency information between the load/store requests. In an actual application, after the processor core 12 in the processor 10 obtains the dependency information between the plurality of instructions, when a load/store instruction does not hit the cache 14, the processor core 12 may add dependency information of a load/store request to the load/store request that is sent to the memory controller 20 based on the load/store instruction. The dependency information includes information such as an identifier of a register on which the load/store request depends and an offset. The identifier of the register may include $SR_1$ and $SR_2$ in the dependency relationship, and offset information may include offset described above. $SR_1$ and $SR_2$ are numbers of registers on which the instruction depends, an arithmetic symbol representing "add" or "subtract" is added in the front of a number of a register, and offset is an immediate. The memory controller 20 may calculate, based on the dependency information carried in the load/store request and based on a predefined calculation method, an address to be accessed by using the load/store request. Then, the memory controller 20 may access the memory 30 based on the calculated to-be-accessed address. In this embodiment of the present disclosure, an address to be accessed by a load/store instruction may also be referred to as a load/store address.

It may be understood that, the dependency relationship table 302 in FIG. 3 is merely an example of the dependency relationship between the plurality of instructions obtained by the processor. In an actual application, the processor may alternatively record the dependency relationship between the instructions in another manner. Moreover, in a case, the processor may obtain dependency information between various instructions by running software. For example, the processor may traverse and detect, by running software, an identifier of a source register and an identifier of a destination register that are to be accessed by instructions, to obtain and record dependency information between the instructions. In another case, the processor may alternatively detect the dependency relationship between the instructions by using hardware of the processor. Using the instruction queue 301 shown in FIG. 3 as an example, with reference to FIG. 4, the following describes in detail how the processor detects, by using the hardware of the processor, dependency information between processing instructions and sends, to the memory controller 20, a load/store request carrying the dependency information.

FIG. 4 is a signaling diagram of a method for processing a plurality of instructions by a processor according to an embodiment of the present disclosure. As shown in FIG. 4, a person skilled in the art may understand that a processor core 12 may usually include an instruction queue 301, an arithmetic logic unit (ALU) 402, a load/store unit (LSU) 404, and a data forwarding path. In this embodiment of the present disclosure, the data forwarding path means a data forwarding path from an outbound interface of the ALU 402 and the LSU 404 to the instruction queue. A person skilled in the art may understand that the instruction queue 301 may be a hardware queue, and the instruction queue 301 may be implemented by using a plurality of registers. Using the instruction queue 301 shown in FIG. 3 as an example, the following specifically describes how the processor core 12 processes each instruction in the instruction queue 301.

In step S1, when addresses of load/store instructions have no data dependency, the instructions may be directly transmitted by the processor core 12 from the instruction queue 301 of the processor core 12 to the LSU 404. In step S2, when a load/store instruction does not hit a cache, that is, cache miss occurs, in this embodiment of the present disclosure, the processor core 12 adds a first identifier to a destination register of the instruction, and the first identifier is used to indicate that a value of the destination register is speculative. Moreover, the processor core 12 sets the value of the destination register of the processor core 12 to 0, and forwards the instruction to subsequent related instructions in the instruction queue by using the data forwarding path. For example, as shown in FIG. 4, after the load/store instructions ld_1, ld_2, and ld_3 in the instruction queue 301 are transmitted to the LSU 404, if the LSU 404 determines that cache miss occurs in all of the load/store instructions ld_1, ld_2, and ld_3, the LSU 404 may send a load/store request to a memory controller separately based on the load/store instructions ld_1, ld_2, and ld_3 (refer to step S2.1 in FIG. 4). In addition, the processor core 12 may set a first identifier for a destination register (REG_1) of the load/store instruction ld_1, a destination register (REG_2) of the load/store instruction ld_2, and a destination register (REG_3) of the load/store instruction ld_3, and set values of all the destination registers to 0. The processor core 12 may forward the values of the destination register (REG_1) and the destination register (REG_2) to the arithmetical instruction alu_1 in the instruction queue 301 by using the data forwarding path, and forwards the value of the destination register (REG_3) to the load/store instruction ld_5 in the instruction queue 301 by using the data forwarding path (refer to step S2.2 in FIG. 4).

It should be noted that in the prior art, when cache miss occurs in a processing instruction and consequently a destination register of the instruction is unavailable, a subsequent instruction depending on the destination register cannot be transmitted to an LSU. However, in this embodiment of the present disclosure, to obtain dependency information between a plurality of processing instructions in the instruction queue 301, when cache miss occurs in an instruction, cache miss occurring in the instruction is identified by labeling a destination register of the load/store instruction as speculative and setting a value of the destination register of the load/store instruction to 0. In this way, a subsequent instruction depending on the destination register is not blocked in the processor core 12, resources of the processor are not occupied, more opportunities are provided to transmit the subsequent instruction, and cache miss occurring in the subsequent instruction can be found earlier, thereby reducing a memory access delay.

In step S3, for an arithmetical instruction in the instruction queue 301, if the processor core 12 determines that a value of a source register of the arithmetical instruction is in a speculative state, the processor core 12 may transmit the instruction from the instruction queue 301 to the ALU 402, and generate dependency information. For example, for the arithmetical instruction alu_1 in the instruction queue 301, the processor core 12 determines that source registers REG_1 and REG_2 of the instruction are both speculative. Therefore, the processor core 12 may transmit the arithmetical instruction alu_1 to the ALU 402, and the ALU 402 executes the arithmetical instruction alu_1. Moreover, the processor core 12 may record dependency information between the arithmetical instruction alu_1 and the load/store instructions ld_1 and ld_2. Specifically, the processor core 12 may record identifiers of registers on which the arithmetical instruction alu_1 depends (for example, the source registers REG_1 and REG_2) and offset information. In step S4, the ALU 402 executes the arithmetical instruction alu_1. Specifically, because the values of the REG_1 and REG_2 are 0, an arithmetical result of the arithmetical instruction alu_1 is 0. Further, when the processor core needs to provide, by using the data forwarding path, the destination register REG_6 of alu_1 to a subsequent instruction that is in the instruction queue 301 and that needs to access the destination register REG_6, the processor core 12 sets a second identifier for the destination register REG_6, and the second identifier is used to indicate that a value of the destination register depends on values of other registers. In other words, the second identifier is used to indicate that the value of the destination register is used to transfer a dependency relationship. The ALU 402 forwards, by using the data forwarding path, the value of the destination register REG_6 of alu_1 and dependency information to the subsequent instruction that is in the instruction queue 301 and that needs to access the destination register REG_6.

In step S5, for an arithmetical instruction in the instruction queue 301, if the processor core 12 determines that a source register of the arithmetical instruction includes a second identifier used to indicate that a value of the source register is in a depend state, the processor core 12 may transmit the instruction from the instruction queue 301 to the ALU 402, and generate dependency information. For example, for the arithmetical instruction alu_2 in the instruction queue 301, because a source register of the arithmetical instruction alu_2 is the destination register REG_6 of the arithmetical instruction alu_1, and the value of the destination register REG_6 is in the depend state, the processor core 12 may transmit the arithmetical instruction alu_2 to the ALU 402. Moreover, because the value of the source register REG_6 of the arithmetical instruction alu_2 depends on the values of the registers REG_1 and REG_2, the processor core 12 may record the dependency information between the arithmetical instruction alu_2 and the load/store instructions ld_1 and ld_2. For example, the processor core 12 may record identifiers of registers (for example, source registers REG_1 and REG_2) on which the arithmetical instruction alu_2 depends. In step S6, the ALU 402 may execute the arithmetical instruction alu_2 to obtain a calculation result of the arithmetical instruction alu_2, and send, by using the data forwarding path, the dependency information and the calculation result of the arithmetical instruction alu_2 to a subsequent instruction (for example, the load/store instruction ld_4) that is in the instruction queue 301 and that needs to access the destination register REG_7 of the arithmetical instruction alu_2. Specifically, because the value of the register REG_6 is 0, an execution result of the ALU 402 based on the arithmetical instruction alu_2 is −100. This indicates that an offset of the subsequent instruction (the load/store instruction ld_4) that needs to access the destination register REG_7 of the arithmetical instruction alu_2 is −100. The ALU 402 may forward a value of the destination register REG_7 and the dependency information of the instruction (for example, the instruction depends on REG_1 and REG_2 and an offset is −100) to the load/store instruction ld_4 in the instruction queue 301 by using the data forwarding path.

In step S7, for a consumer load/store instruction in the instruction queue 301, if a register on which a load/store address of the consumer load/store instruction depends includes a second identifier that is used to indicate that a value of a source register is in a depend state, the load/store instruction may be transmitted to the LSU 404, and a dependency relationship is transferred. For example, the processor core 12 determines that the load/store instruction ld_4 is a consumer load/store instruction, and a load/store address of the load/store instruction ld_4 depends on the register REG_7. Because the register REG_7 is in the depend state, the processor core 12 may transmit the load/store instruction ld_4 to the LSU 404. In step S8, the LSU 404 executes the load/store instruction ld_4, and if cache miss occurs in the load/store instruction ld_4, the processor core 12 may send a load/store request to the memory controller 20 based on the load/store instruction ld_4. The load/store request sent to the memory controller 20 based on the load/store instruction ld_4 includes dependency information of the load/store request. For example, the dependency information may include that the registers REG_1 and REG_2 are depended on and an offset is −100.

In step S9, for a consumer load/store instruction in the instruction queue 301, if a register on which a load/store address of the consumer load/store instruction depends includes a first identifier indicating speculative, that is, if a value of the register on which the load/store address of the consumer load/store instruction depends is speculative, the processor core 12 may transmit the load/store instruction to the LSU 404 and record dependency information of the load/store instruction. For example, the processor core 12 determines that the load/store instruction ld_5 is a consumer load/store instruction depending on the register REG_3, and the processor core 12 may record that an identifier of the register on which the load/store instruction ld_5 depends is REG_3, and transmit the load/store instruction ld_5 to the LSU 404. In step S10, the LSU 404 executes the load/store instruction ld_5, and if cache miss occurs in the load/store instruction ld_5, the processor core 12 may send a load/store request to the memory controller 20 based on the load/store instruction ld_5. Specifically, the load/store request sent by the processor core 12 to the memory controller 20 based on the load/store instruction ld_5 may include dependency information of the load/store request. For example, the dependency information may include that the register REG_3 is depended on.

In conclusion, when processing the plurality of processing instructions in the instruction queue 301, the processor core 12 may perform processing based on several rules described below:

1) When cache miss occurs in a load/store instruction, a first identifier is set for a destination register of the load/store instruction, and a state of the destination register of the load/store instruction is labeled as a speculative state. The load/store instruction and subsequent related instructions of the load/store instruction are transmitted for execution. When processing the load/store instruction, the LSU 404 may set a value of the destination register of the load/store instruction to 0. But it should be noted that in this case, although the load/store instruction is transmitted to the LSU 404 for execution, the processor core does not change a state of the processor.

2) When a source register of an arithmetical instruction includes a first identifier, that is, a source register of an arithmetical instruction is in a speculative state, the processor core 12 may label that a destination register of the arithmetical instruction is in a depend state, and record a register on which the destination register of the arithmetical instruction depends.

3) When a source register of an arithmetical instruction includes a second identifier, that is, a source register of an arithmetical instruction is in a depend state, the processor core 12 may label that a destination register of the arithmetical instruction is in a depend state, and record a register on which the source register of the arithmetical instruction depends. In such a manner, the arithmetical instruction may transfer a dependency relationship.

4) When a register on which a load/store address of a load/store instruction depends includes a first identifier, that is, a source register of a load/store instruction is in a speculative state, the processor core 12 may record, in a load/store request that is obtained based on the load/store instruction, the register on which the load/store instruction depends.

5) When a register on which a load/store address of a load/store instruction depends includes a second identifier, that is, a source register of a load/store instruction is in a depend state, the processor core 12 may record, in a load/store request that is obtained based on the load/store instruction, the register on which the source register of the load/store instruction depends.

Generally, in a case, when a consumer load/store instruction directly depends on a producer load/store instruction, an identifier of a destination register of the producer load/store instruction is carried in a consumer load/store request. In another case, when an address to be accessed by a consumer load/store instruction depends on a destination register of an arithmetical instruction, and the destination register of the arithmetical instruction depends on a destination register of a producer load/store instruction, an identifier of the destination register of the producer load/store instruction and an offset of the to-be-accessed address are carried in a consumer load/store request. The offset may be obtained based on an arithmetical result of the arithmetical instruction.

It should be noted that a consumer load/store instruction usually depends on no more than two producer load/store instructions. In addition, to reduce hardware overheads caused when the memory controller processes a load/store request, in this embodiment of the present disclosure, when dependency information between load/store instructions is obtained, a description is provided by using an example in which a load/store instruction depends on no more than two load/store instructions. In other words, in this embodiment of the present disclosure, a description is provided by using an example in which a consumer load/store instruction depends on no more than two producer load/store instructions. It may be understood that in an actual application, when a consumer load/store instruction depends on more than two producer load/store instructions, the processor 10 may also process the instructions in the manner provided in this embodiment of the present disclosure.

Based on the method for the instructions provided in the processing instruction queue 301, the processor core 12 may obtain the dependency information between the instructions in the instruction queue 301, and send the load/store request to the memory controller based on the load/store instructions and the obtained dependency information. In this way, the dependency information between the plurality of processing instructions obtained by the processor core 12 can be sent to the memory controller, and blocking of the processing instructions in the processor is avoided, resources of the processor occupied by the processing instruction are reduced, and a waiting delay of the subsequent instruction is reduced.

In the method for processing a load/store instruction provided in this application, when processing load/store instructions having a dependency relationship, instead of transmitting a load/store instruction for execution after the dependency relationship between the load/store instructions is terminated, the processor obtains and records dependency information between the load/store instructions in a speculative execution manner, and adds the obtained dependency information to a corresponding load/store request. The dependency information between the load/store instructions is generated mainly by using original functional units (for example, the ALU, the LSU, and the data forwarding path) in the processor core. Based on the method provided in this embodiment of the present disclosure, the dependency information between the load/store instructions is recorded provided that a small quantity of labels are added to the data forwarding path. Therefore, additional hardware overheads of the processor are not increased.

The foregoing describes only how the processor processes load/store instructions having a dependency relationship in this embodiment of the present disclosure. It may be understood that in an actual application, the processor 10 may further preferentially process a load/store instruction that is in an instruction queue and that does not depend on other instructions. In this embodiment of the present disclosure, a load/store instruction not depending on other instructions may be referred to as an independent load/store instruction. In such a manner, the processor 10 may trigger an independent load/store request in advance, to further reduce a waiting delay of the processor in processing a subsequent instruction.

Figure 5:
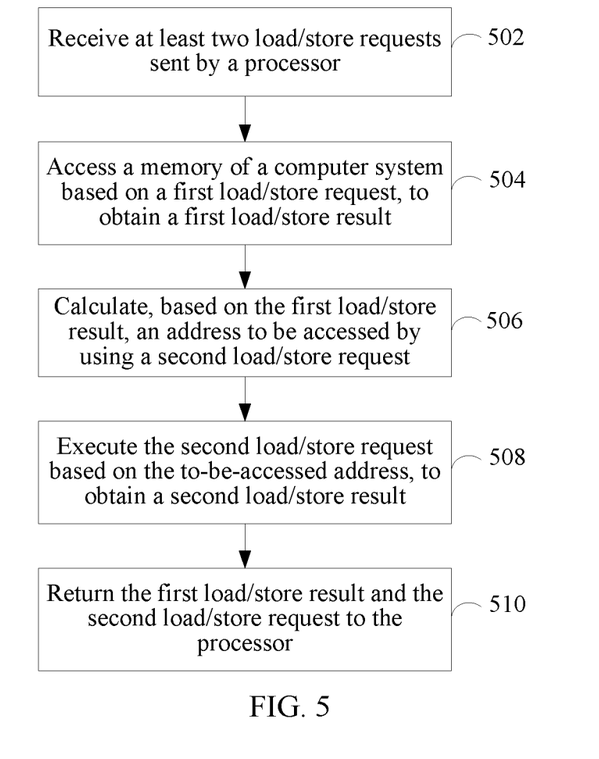
FIG. 5 is a flowchart of a memory access method according to an embodiment of the present disclosure.

The foregoing describes how the processor 10 processes load/store instructions having a dependency relationship, and the following describes in detail how the memory controller 20 processes load/store requests having a dependency relationship. FIG. 5 is a flowchart of a method for processing load/store requests having a dependency relationship by a memory controller according to an embodiment of the present disclosure. For ease of description, in this embodiment of the present disclosure, a description is provided by using an example in which a first load/store request is a producer load/store request and a second load/store request is a consumer load/store request. The producer load/store request is a load/store request sent by the processor 10 based on a producer load/store instruction, and the consumer load/store request is a load/store request sent by the processor 10 based on a consumer load/store instruction. It may be understood that when two load/store instructions have a dependency relationship, corresponding load/store requests obtained based on the two load/store instructions also have a same dependency relationship. As shown in FIG. 5, the method may include the following steps.

Figure 6:
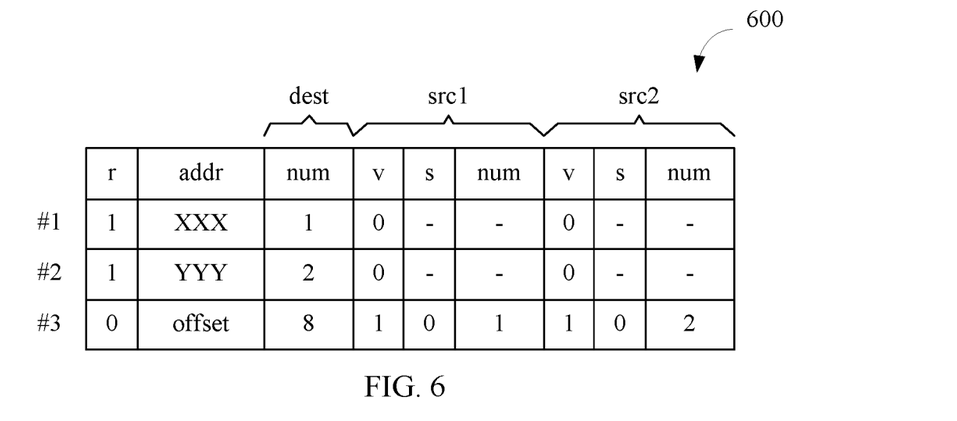
FIG. 6 is a schematic diagram of a format of a load/store request according to an embodiment of the present disclosure.

In step 502, a memory controller 20 receives at least two load/store requests sent by a processor. In an actual application, the memory controller 20 may cache the received at least two load/store requests in a load/store request queue. In this embodiment of the present disclosure, to record dependency information between the load/store requests, some fields are added to each entry in the load/store request queue in the memory controller 20. FIG. 6 is a schematic diagram of a load/store request queue according to an embodiment of the present disclosure. It should be noted that FIG. 6 shows a plurality of load/store requests having a dependency relationship by using only an example in which a #3 load/store request depends on a #1 load/store request and a #2 load/store request. The #1 load/store request is a load/store request that is sent by the processor 10 to the memory controller 20 based on the load/store instruction Ld_1 in FIG. 3, the #2 load/store request is a load/store request that is sent by the processor 10 to the memory controller 20 based on the load/store instruction Ld_2 in FIG. 3, and the #3 load/store request is a load/store request that is sent by the processor 10 to the memory controller 20 based on the load/store instruction Ld_4 in FIG. 3. As shown in FIG. 6, in the load/store request queue of the memory controller 20, each entry includes the following fields.

Ready identifier (ready, r) bit: used to indicate whether a load/store request can be sent to a memory. For example, when a value of the "r" bit is 0, it indicates that the load/store request is not ready and a memory cannot be accessed based on the load/store request. When a value of the "r" bit is 1, it indicates that the load/store request is ready and a memory can be accessed based on the load/store request.

Address (addr) bit: used to indicate a memory address to be accessed by a load/store request.

Destination register (dest) bit: used to indicate an identifier of a register storing a load/store result of a load/store request. In other words, the dest bit is used to indicate an identifier of a destination register to which a load/store request is written back.

Source register (src) field: used to indicate an identifier of a register on which an address to be accessed by a load/store request depends. In this embodiment of the present disclosure, a source register field of each load/store request may specifically include three parts: a valid bit, a signal bit, and a register identifier (num) bit. The valid bit is used to indicate whether a load/store request has a dependency relationship with other load/store requests. The signal bit is used to indicate a positive or negative value of a register on which a load/store request depends. The Num bit is used to indicate an identifier of a register (for example, a number of a register) on which an address to be accessed by a load/store request depends. It should be noted that in this embodiment of the present disclosure, a description is provided by using an example in which a consumer load/store request depends on no more than two producer load/store requests. Therefore, in this embodiment of the present disclosure, the source register field in the load/store request is used to record identifiers of destination registers of two producer load/store requests. For example, identifiers of destination registers of two producer load/store requests may be recorded by using src 1 and src 2 fields in FIG. 6.

In step 504, the memory controller 20 accesses the memory 30 based on the first load/store request to obtain a first load/store result. Specifically, for the producer load/store request in the load/store request queue (for example, the #1 load/store request in FIG. 6), when the memory controller 20 determines that the ready bit of the producer load/store request indicates the load/store request is ready, the memory controller 20 may access the memory 30 based on a load/store address (for example, the address: xxx in FIG. 6) of the first load/store request, to obtain the first load/store result. A person skilled in the art may understand that, the first load/store result may be data read from the memory 30. Similarly, because the #2 load/store request in FIG. 6 is also a producer load/store request, the memory controller 20 may alternatively access the memory 30 based on an address (for example, YYY) to be accessed by the #2 load/store request, to obtain a load/store result of the #2 load/store request.

In step 506, the memory controller 20 calculates, based on the first load/store result, an address to be accessed by using the second load/store request. Specifically, after the memory controller 20 obtains the first load/store result, the memory controller 20 may calculate, based on the first load/store result and dependency information of the second load/store request recorded in a load/store request list and based on a specified calculation method, the address to be accessed by using the second load/store request. In an actual application, the memory controller 20 may compare an identifier of a destination register of the first load/store request with register identifiers in src 1 and src 2 of the second load/store request (a load/store request that is not ready) in the load/store request queue. If the two matches, the memory controller 20 may calculate, based on the foregoing calculation method, the address to be accessed by using the second load/store request:

$$\text{Address} = \sum_{k=1}^{n} REG[SR_k] + \text{Offset}.$$

It may be understood that in an actual application, a value of offset may be 0. When $SR_1$ is used to store a load/store result of a first load/store instruction, $REG[SR_1]$ is used to indicate a load/store result of the first load/store request. In such a manner, the memory controller 20 may accumulate results of the first load/store request to an addr bit of the second load/store request. Further, the memory controller 20 sets a corresponding valid bit to 0 to indicate that a dependency relationship between the second load/store request and the first load/store request is terminated. It may be understood that if the second load/store request depends on two producer load/store requests, when dependency relationships between the second load/store request and both the producer load/store requests are terminated, the memory controller 20 may set a ready identifier in the second load/store request to 1, to indicate that the second load/store request is ready.

For example, the #3 load/store request in FIG. 6 is the second load/store request. A load/store address of the #3 load/store request depends on a register 1 (a destination register of the #1 load/store request) and a register 2 (a destination register of the #2 load/store request). After the memory controller 20 obtains a load/store result of the #1 load/store request and a load/store result of the #2 load/store request, the memory controller 20 may calculate, based on the load/store result of the #1 load/store request, the load/store result of the #2 load/store request, and dependency information carried in the #3 load/store request, an address to be accessed by using the #3 load/store request. Specifically, as shown in FIG. 6, the address to be accessed by using the #3 load/store request is a sum of the load/store result of the #1 load/store request, the load/store result of the #2 load/store request, and an offset. In an actual application, after the address to be accessed by using the #3 load/store request is obtained, a ready bit in the #3 load/store request may be set to 1 to indicate that the #3 load/store request is ready, and the memory controller 20 may access the memory 30 based on the #3 load/store request. It may be understood that, in FIG. 6, for example, a consumer load/store request (for example, the #3 load/store request) depends on two producer load/store requests (the #1 load/store request and the #2 load/store request). In an actual application, the consumer load/store request may depend on one or more producer load/store requests.

In step 508, the memory controller 20 executes the second load/store request based on the to-be-accessed address, to obtain a second load/store result. In an actual application, after the memory controller 20 obtains the address to be accessed by using the consumer load/store request in step 506, the memory controller 20 may access the memory 30 based on the calculated address to be accessed by using the consumer load/store request, to obtain a load/store result of the consumer load/store request. For example, the #3 load/store request in FIG. 6 is the second load/store request. After the memory controller 20 obtains the address to be accessed by using the #3 load/store request, the memory controller 20 may executes the #3 load/store request based on the to-be-accessed address, to obtain a second load/store result.

In step 510, the memory controller 20 returns the first load/store result and the second load/store result to the processor 10. In an actual application, after the memory controller 20 executes the first load/store request and obtains the first load/store result from the memory 30, the memory controller 20 may return the first load/store result to the processor 10. Specifically, the memory controller 20 may store the first load/store result in the cache 14 of the processor 10. The processor 10 executes the first load/store instruction, obtains the first load/store result from the cache 14, and stores the first load/store result in a destination register (for example, a register REG_1) of the first load/store instruction (for example, the load/store instruction Ld_1 in FIG. 3). In other words, after the processor 10 obtains the first load/store result, the processor 10 updates a value of the destination register of the first load/store instruction based on the first load/store result. Similarly, after the memory controller 20 executes the second load/store request (for example, the #3 load/store request in FIG. 6) having a dependency relationship with the first load/store request, the memory controller 20 also returns the second load/store result of the second load/store request to the processor 10. When executing a second load/store instruction (for example, the load/store instruction Ld_4 in FIG. 3) corresponding to the second load/store request, the processor 10 may obtain the second load/store result from the cache 14 and store the second load/store result in a destination register (for example, the register REG_8) of the second load/store instruction.

In the memory access method provided in this application, when the memory controller receives the first load/store request and the second load/store request that have a dependency relationship, the memory controller may first execute the first load/store request. The first load/store request is a producer load/store request. The second load/store request carries dependency information used to indicate that the second load/store request depends on the first load/store request. Therefore, after obtaining a load/store result of the first load/store request, the memory controller may calculate, based on the load/store result of the first load/store request and the dependency information carried in the second load/store request and based on the predefined calculation method, the address to be accessed by using the second load/store request, so that the dependency relationship between the second load/store request and the first load/store request can be terminated in the memory controller and the second load/store request is executed based on the calculated address to be accessed by using the second load/store request. Based on the memory access method provided in this application, when processing load/store requests having a dependency relationship, the memory controller can calculate, in a memory controller based on the load/store result of the producer load/store request and the dependency information carried in the consumer load/store request, an address to be accessed by using a consumer access, so that the dependency relationship between the load/store requests can be terminated in the memory controller locally without re-communication with the processor, and the consumer load/store request is executed. A quantity of times of communications between the memory controller and the processor core is reduced, network resources are saved, and a memory access delay is further reduced.

Moreover, in the memory access method provided in this application, because description of the dependency information is added to a load/store request queue, when the memory controller processes load/store requests having a dependency relationship, the memory controller can calculate, based on the load/store result of the producer load/store request and the dependency information carried in the consumer load/store request, the address to be accessed by using the consumer access, and a calculation manner is simple. In an actual application, the memory controller can calculate, with only one adder, an address to be accessed by using the consumer load/store request. Therefore, hardware overheads of the memory controller are relatively low.

Figure 7:
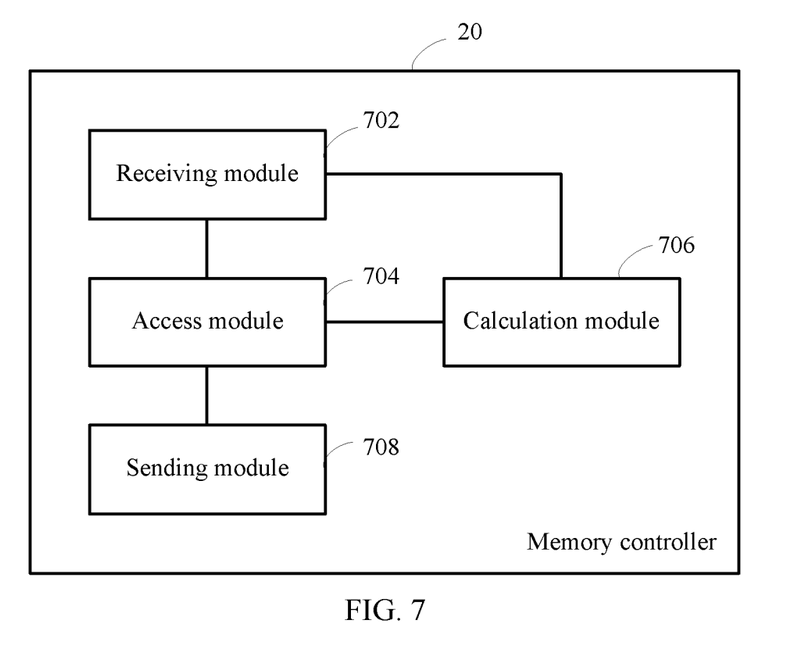
FIG. 7 is a schematic structural diagram of a memory controller according to an embodiment of the present disclosure.

FIG. 7 is a schematic structural diagram of a memory controller according to an embodiment of the present disclosure. The memory controller shown in FIG. 7 may be the memory controller 20 in FIG. 1. As shown in FIG. 7, the memory controller 20 may include a receiving module 702, an access module 704, a calculation module 706, and a sending module 708 described below.

The receiving module 702 is configured to receive a first load/store request and a second load/store request that are sent by the processor, where the second load/store request includes first dependency information, the first dependency information is used to indicate that an address to be accessed by using the second load/store request depends on a value of a first destination register of the first load/store request, and the first destination register is configured to store a first load/store result of the first load/store request.

The access module 704 is configured to access a memory of a computer system based on the first load/store request, to obtain the first load/store result.

The calculation module 706 is configured to calculate, based on the first load/store result and the first dependency information, an address to be accessed by using the second load/store request.

The access module 704 is further configured to execute the second load/store request based on the address to be accessed by using the second load/store request, to obtain a second load/store result.

The sending module 708 is configured to return the first load/store result and the second load/store result to the processor.

In an actual application, the first dependency information includes an identifier of the first destination register and first offset information. The calculation module 706 is specifically configured to calculate, based on the first load/store result and the first offset information and based on a predefined calculation method, the address to be accessed by using the second load/store request.

In this embodiment of the present disclosure, the predefined calculation method includes:

$$\text{Address} = \sum_{k=1}^{n} REG[SR_k] + \text{Offset},$$

where Address is a memory address to be accessed by using a load/store request, n is a quantity of registers on which the load/store request depends, $REG[SR_k]$ is used to indicate content stored in a $k^{th}$ register on which the load/store request depends, and Offset is an address offset.

Optionally, in this embodiment of the present disclosure, the receiving module 702 is further configured to receive a third load/store request sent by the processor based on a third load/store instruction, where an address to be accessed by using the third load/store instruction depends on a destination register of a fourth instruction, a source register to be operated by the fourth instruction depends on the first destination register, the third load/store request carries third dependency information, the third dependency information includes the identifier of the first destination register and second offset information that is obtained based on the fourth instruction, the source register to be operated by the fourth instruction is used to store data to be operated by the fourth instruction, and the fourth instruction is used to instruct to calculate a value of the first destination register. The calculation module 706 is further configured to calculate, based on the first load/store result and the second offset information, an address to be accessed by using the third load/store instruction. The access module 704 is further configured to access the memory based on the third load/store instruction, to obtain a third load/store result.

The memory controller 20 provided in this embodiment of the present disclosure may be configured to perform the foregoing memory access method. Specifically, for detailed description of a function of each module, refer to the related description of the memory controller in the foregoing embodiments, and details are not described herein again.

In should be noted that, in this application, the terms "first", "second", "third", "fourth", and so on are intended to distinguish different objects instead of indicating a particular order of the objects. The term "a plurality of" in this specification means two or more.

An embodiment of the present disclosure further provides a computer program product for a memory access method, including a computer readable storage medium that stores program code, where an instruction included in the program code is used to execute the method process described in any one of the foregoing method embodiments. An ordinary person skilled in the art may understand that the foregoing storage medium includes any non-transitory machine-readable medium capable of storing program code, such as a USB flash drive, a removable hard disk, a magnetic disk, an optical disc, a random-access memory (RAM), a solid state disk (SSD), or another non-volatile memory.

It should be noted that the embodiments provided in this application are merely examples. A person skilled in the art may clearly know that, for convenience and conciseness of description, in the foregoing embodiments, the embodiments emphasize different aspects, and for a part not described in detail in an embodiment, refer to relevant descriptions of another embodiment. The embodiments of the present disclosure, claims, and features disclosed in the accompanying drawings may exist independently, or exist in combination. Features described in a hardware form in the embodiments of the present disclosure may be executed by software, and vice versa, and this is not limited herein.

What is claimed is:

1. A computer system comprising: a processor, a memory and a memory controller, wherein the processor is configured to:
   obtain first dependency information between a first to-be-processed load/store instruction and a second to-be-processed load/store instruction, wherein the first dependency information indicates that an address to be accessed by using the second load/store instruction depends on a value of a first destination register of the first load/store instruction, and the first destination register is configured to store a first load/store result of the first load/store instruction;
   send a first load/store request to the memory controller in the computer system based on the first load/store instruction; and
   send a second load/store request to the memory controller based on the second load/store instruction, wherein the second load/store request comprises the first dependency information; and
the memory controller is configured to:
   access the memory of the computer system based on the first load/store request, to obtain the first load/store result of the first load/sore request;
   determine an address to be accessed by using the second load/store request, wherein the determination is based on the first load/store result, the first dependency information carried in the second load/store request and on a predefined determination method;
   terminate the dependency relationship between the second load/store request and the first load/store request;
   execute the second load/store request based on the address to be accessed by using the second load/store request, to obtain a second load/store result; and
   return the first load/store result and the second load/store result to the processor.

2. The computer system according to claim 1, wherein the first dependency information comprises an identifier of the first destination register and first offset information, and the first offset information indicates an offset of the address to be accessed by using the second load/store request; and
   in response to determining the address to be accessed by using the second load/store request, the memory controller is configured to: obtain, based on the first load/store result the first offset information, and the predefined determination method, the address to be accessed by using the second load/store request.

3. The computer system according to claim 2, wherein the predefined determination method comprises:

$$\text{Address} = \sum_{k=1}^{n} REG[SR_k] + \text{Offset},$$

wherein Address is a memory address to be accessed by using a load/store request, n is a quantity of registers on which the load/store request depends, $REG[SR_k]$ indicates content stored in a $k^{th}$ register on which the load/store request depends, and Offset is an address offset, wherein n and k are positive integers.

4. The computer system according to claim 1, wherein the processor is configured to:
   set a first identifier for the first destination register when the first load/store instruction does not hit a cache of the computer system, wherein the first identifier indicates that a value of the first destination register is speculative; and
   send the first load/store request to the memory controller based on the first load/store instruction.

5. The computer system according to claim 4, wherein the processor is further configured to:
   obtain third dependency information between a third to-be-processed load/store instruction and the first load/store instruction,
      wherein an address to be accessed by using the third load/store instruction depends on a destination register of a fourth instruction, a source register to be operated by the fourth instruction depends on the first destination register, the source register to be operated by the fourth instruction stores data to be operated by the fourth instruction, and the fourth instruction instructs to calculate the value of the first destination register; and send, to the memory controller based on the third load/store instruction, a third load/store request carrying the third dependency information, wherein the third dependency information comprises an identifier of the first destination register and second offset information that is obtained based on the fourth instruction; and the memory controller is further configured to:

obtain, based on the first load/store result and the second offset information, an address to be accessed by using the third load/store request; and execute the third load/store request based on the address to be accessed by using the third load/store request, to obtain a third load/store result.

6. A processor of a computer system, the processor comprising:

an instruction queue configured to cache a first to-be-processed load/store instruction and a second to-be-processed load/store instruction and obtain first dependency information between the first load/store instruction and the second load/store instruction, wherein the first dependency information indicates that an address to be accessed by using the second load/store instruction depends on a value of a first destination register of the first load/store instruction, and wherein the first destination register is configured to store a first load/store result of the first load/store instruction; and a load/store unit (LSU) configured to send a first load/store request to a memory controller in the computer system based on the first load/store instruction; and send a second load/store request to the memory controller based on the second load/store instruction, wherein the second load/store request comprises the first dependency information, and wherein sending the first load/store request based on the first load/store request and the second load/store request causes the memory controller to (i) access a memory based on the first load/store request to obtain a first load/store result (ii) determine a memory address to be accessed by the second load/store request based on the first load/store result and the first dependency information, (iii) terminate the dependency relationship between the first and second load/store requests, and (iv) access the memory based on the determined memory address to obtain a second load/store result.

7. The processor according to claim 6, wherein the LSU is further configured to:

set a first identifier for the first destination register when the first load/store instruction does not hit a cache of the computer system, wherein the first identifier indicates that a value of the first destination register is speculative; and send the first load/store request to the memory controller based on the first load/store instruction.

8. The processor according to claim 7, wherein the instruction queue is further configured to obtain third dependency information between a third to-be-processed load/store instruction and the first load/store instruction, wherein an address to be accessed by using the third load/store instruction depends on a destination register of a fourth instruction, a source register to be operated by the fourth instruction depends on the first destination register, the source register to be operated by the fourth instruction stores data to be operated by the fourth instruction, and the fourth instruction instructs to obtain the value of the first destination register; and the LSU is further configured to send, to the memory controller based on the third load/store instruction, a third load/store request carrying the third dependency information, wherein the third dependency information comprises an identifier of the first destination register and second offset information that is obtained based on the fourth instruction.

9. A memory access method, wherein the method is applied to a computer system comprising a processor and a memory controller, and the method comprises:

obtaining, by the processor, first dependency information between a first to-be-processed load/store instruction and a second to-be-processed load/store instruction, wherein the first dependency information indicates that an address to be accessed by using the second load/store instruction depends on a value of a first destination register of the first load/store instruction, and the first destination register is configured to store a first load/store result of the first load/store instruction;

sending, by the processor, a first load/store request to the memory controller in the computer system based on the first load/store instruction;

sending, by the processor, a second load/store request to the memory controller based on the second load/store instruction, wherein the second load/store request comprises the first dependency information;

accessing, by the memory controller, a memory of the computer system based on the first load/store request, to obtain the first load/store result;

determine the address to be accessed by using the second load/store result, wherein the determination is based on the first load/store result, the first dependency information carried in the second load/store request and on a predefined determination method;

terminate the dependency relationship between the second load/store request and the first load/store request;

executing, by the memory controller, the second load/store request based on the address to be accessed by using the second load/store request, to obtain a second load/store result; and returning, by the memory controller, the first load/store result and the second load/store result to the processor.

10. The memory access method according to claim 9, wherein the first dependency information comprises an identifier of the first destination register and first offset information, and the first offset information indicates an offset of the address to be accessed by using the second load/store request; and wherein determining, by the memory controller, the address to be accessed by using the second load/store request comprises:

obtaining, based on the first load/store result, the first offset information, and the predefined determination method, the address to be accessed by using the second load/store request.

11. The memory access method according to claim 10, wherein the predefined determination method comprises:

$$\text{Address} = \sum_{k=1}^{n} REG[SR_k] + \text{Offset},$$

wherein Address is a memory address to be accessed by using a load/store request, n is a quantity of registers on which the load/store request depends, $REG[SR_k]$ is used to indicate content stored in a $k^{th}$ register on which the load/store request depends, and Offset is an address offset, wherein n and k are positive integers.

12. The method according to claim 9, further comprising:
setting, by the processor, a first identifier for the first destination register when the first load/store instruction does not hit a cache of the computer system, wherein the first identifier indicates that a value of the first destination register is speculative; and sending, by the processor, the first load/store request to the memory controller based on the first load/store instruction.

13. The method according to claim 12, further comprising:
obtaining, by the processor, third dependency information between a third to-be-processed load/store instruction and the first load/store instruction, wherein an address to be accessed by using the third load/store instruction depends on a destination register of a fourth instruction, a source register to be operated by the fourth instruction depends on the first destination register, the source register to be operated by the fourth instruction stores data to be operated by the fourth instruction, and the fourth instruction instructs to obtain the value of the first destination register;

sending, by the processor to the memory controller based on the third load/store instruction, a third load/store request carrying the third dependency information, wherein the third dependency information comprises an identifier of the first destination register and second offset information that is obtained based on the fourth instruction;

obtaining, by the memory controller based on the first load/store result and the second offset information, an address to be accessed by using the third load/store request; and executing, by the memory controller, the third load/store request based on the address to be accessed by using the third load/store request, to obtain a third load/store result.

* * * * *